(No Model.) 4 Sheets—Sheet 1.

F. DANKS.
MACHINE FOR MAKING RIVETS.

No. 441,229. Patented Nov. 25, 1890.

WITNESSES
William A. Sweet
Charles S. Brintnall

INVENTOR
Frank Danks
by W. E. Hagan atty (No Model.) 4 Sheets—Sheet 2.

F. DANKS.
MACHINE FOR MAKING RIVETS.

No. 441,229. Patented Nov. 25, 1890.

(No Model.) 4 Sheets—Sheet 3.

F. DANKS.
MACHINE FOR MAKING RIVETS.

No. 441,229. Patented Nov. 25, 1890.

WITNESSES
William A. Sweet
Charles D. Brintnall

INVENTOR
Frank Danks
by W. E. Hagan atty (No Model.)  4 Sheets—Sheet 4.

F. DANKS.
MACHINE FOR MAKING RIVETS.

No. 441,229. Patented Nov. 25, 1890.

WITNESSES
William A. Swert
Charles S. Brintnall

INVENTOR
Frank Danks
by W. E. Hagan atty

THE NORRIS PETERS CO., PHOTO-LITHO., WASHINGTON, D. C.

UNITED STATES PATENT OFFICE.

FRANK DANKS, OF TROY, NEW YORK, ASSIGNOR, BY DIRECT AND MESNE ASSIGNMENTS, OF PART TO HENRY R. OSBORN AND JAMES H. BISSELL, OF SAME PLACE.

MACHINE FOR MAKING RIVETS.

SPECIFICATION forming part of Letters Patent No. 441,229, dated November 25, 1890.

Application filed March 26, 1890. Serial No. 345,303. (No model.)

*To all whom it may concern:*

Be it known that I, FRANK DANKS, of the city of Troy, county of Rensselaer, and State of New York, have invented new and useful Improvements in Machines for Making Rivets, of which the following is a specification.

My invention relates to improvements in machines for making rivets; and my invention has for its object an increased measure of production and a new and better adaptation of machinery to do the work.

My invention consists, as will be more fully detailed hereinafter in connection with its illustration, in the combination of a die-wheel having rivet-dies arranged within the perimeter thereof, said die-wheel being actuated with regular intermittent periods of motion and alternating periods of rest, a feeding mechanism intermittently operated to enter the ends of the rods (from which the rivets are made) within the dies on said die-wheel, a blade operated to cut off the rivet-blanks from the ends of the rods at a proper blank length, a swaging-die reciprocatingly operated to engage with the rivet-blanks where projecting beyond the rivet-dies and to form the heads thereon, and a plunger combined with each of the rivet-dies and operated to push the finished rivets from out the dies.

My invention consists of the sub-combination of the parts of the mechanism shown and described where performing specific functions, as will be designated in the claims.

Accompanying this specification to form a part of it there are four plates of drawings containing eight figures illustrating my invention, with the same designation of parts by letter-reference used in all of them.

Figure 1:
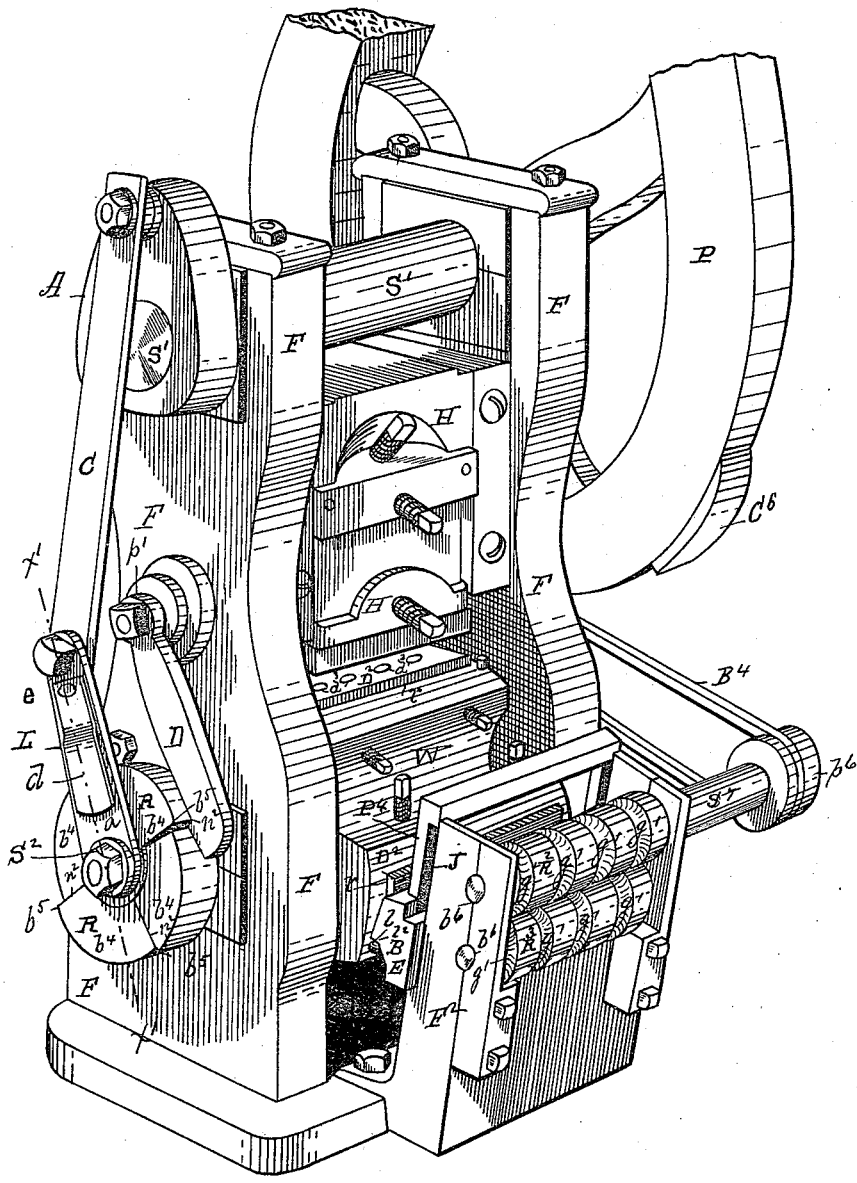
Figure 2:
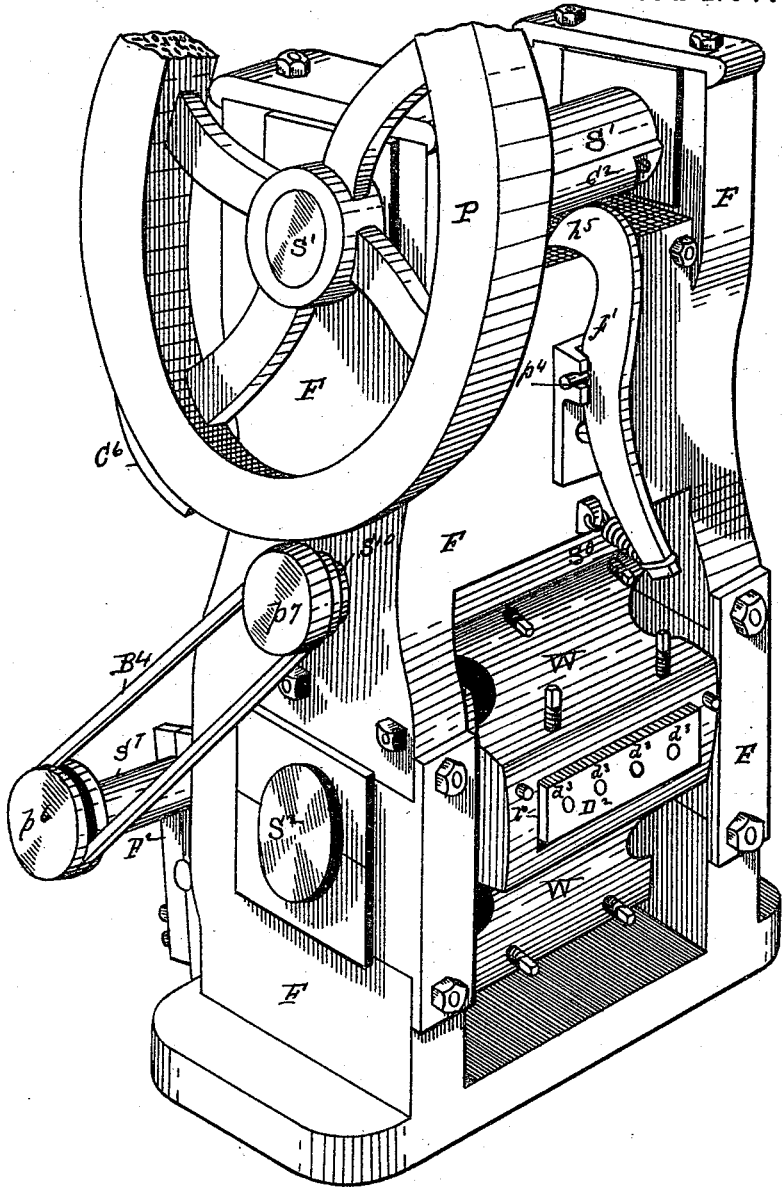
Figure 3:
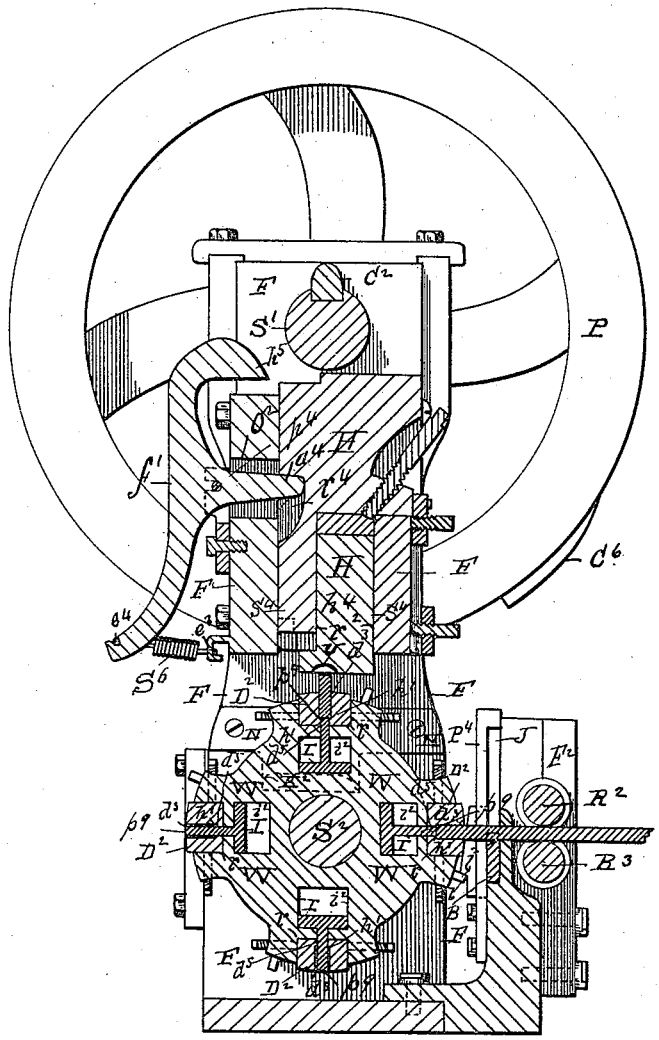
Figure 7:
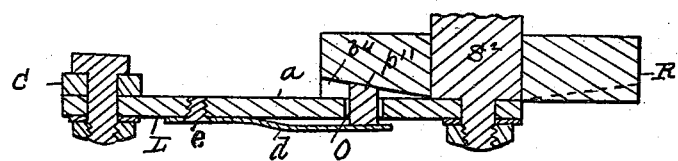
Figure 4:
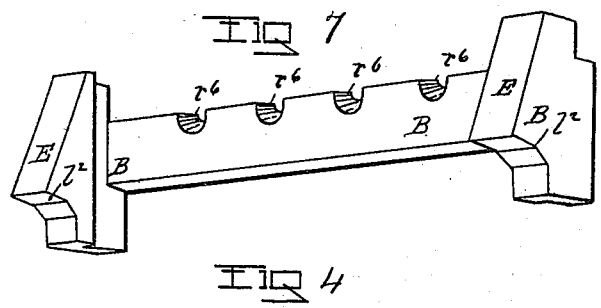
Figure 5:
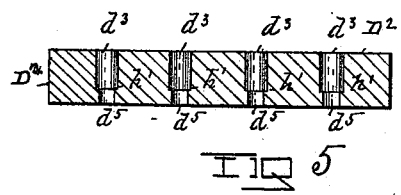
Figure 6:
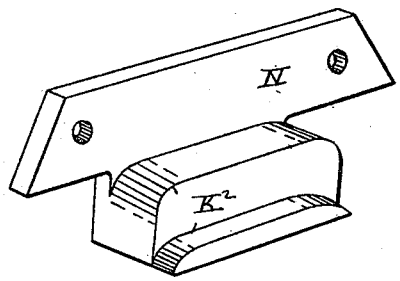
Figure 8:
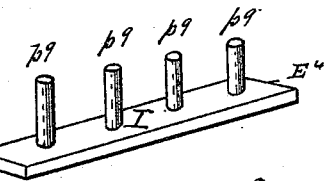

Of the illustrations, Figure 1 is a perspective of my improved rivet-producing machine, and shown in this illustration with what is its front side and one end facing the view. Fig. 2 is another perspective of the same machine, shown with what is its rear end and one side facing the view. Fig. 3 is a vertical section taken centrally from front to rear. Fig. 4 is a side elevation of the blade used to cut the rivet-blanks from the rods supplied to the machine. Fig. 5 is a section of one of the rivet-dies shown as removed from the die-wheel. Fig. 6 is a perspective of one of the cams, there being one on each side of the interior of the machine, which operates the plunger to force the rivets from out the dies. Fig. 7 is a section taken on the line $x'$ $x'$ of Fig. 1. Fig. 8 shows one of the plungers, illustrated as detached.

The several parts of the mechanism thus illustrated are designated by letter-reference, and the function of the parts is described as follows:

The letter F designates the frame of the machine; S', its driving-shaft, receiving power from the pulley P.

The letter $S^2$ designates the die-wheel shaft, and W the die-wheel arranged thereon to turn therewith.

The letter A designates a crank-disk arranged on the shaft S'; C, a crank operated thereby; R, a ratchet arranged on and keyed to the die-wheel shaft $S^2$; L, a latch-pawl pivoted at its upper end to the lower end of the crank C and at its other end to the die-wheel shaft outside of the ratchet-wheel R. This latch-pawl L is arranged to operate in an opening O made in the pawl-arm $a$ and is attached to the inner face of the leaf-spring $d$, which latter at its end $e$ is secured to the arm $a$ with the pawl proper $p''$, adapted to move in the opening O as passing along over the bevels $b^4$ to engage with stops $b^5$ of the ratchet proper. This ratchet has four stops or teeth $b^5$ on its side face, and, as the pawl-arm $a$ is operated by the crank C and latch-arm $a$, the pawl proper at each revolution of the shaft S' will engage with one of the stops $b^5$ to move the ratchet R and die-wheel shaft $S^2$ one-quarter of a turn, and then reciprocatingly move to engage with another ratchet-tooth or stop, it being shown at Figs. 1 and 7.

The letter D designates a pawl-dog, that is pivoted to the frame F at $p'$ and arranged to engage with one of the stops or teeth $n^2$ on the outer side face of the ratchet, and the function of this pawl-dog is that of a detent to make positive the periodic stops of the die-wheel and insure accuracy in the positioning of the die-wheel relatively to the swaging-die.

The die-wheel W has four dies $D^2$, arranged in recesses $r$, made in its outer face, the die-stocks $d^2$ being placed in the outer face of said wheel on a line parallel to the axis of the latter and so as to be diametrically opposite. The dies $D^2$ are made with sinks $d^3$, which latter are round passages formed in the stock $d^2$ at right angles to the top and bottom thereof, as shown at Fig. 5, and these die sinks and passages are each made with a shoulder $h'$, which serves as a stop to regulate the distance at which the rod from which the rivet blanks are to be cut shall enter the dies. Those parts of the die-passages $d^3$ which are beyond the shoulder $h'$ and made of less diameter, as indicated at $d^5$, are used in connection with plungers I for forcing the finished rivets from out the dies, the operation of which will be described hereinafter.

The letter $C^2$ designates a cam constructed on the driving-shaft $S'$, and H a header that is arranged to move in slides $S^4$, made in the machine-frame and shown at Fig. 3. This header has within its lower end a recess $r^2$, adapted to receive and have secured therein a heading-die $h^4$, made with a series of sinks $v$, corresponding in number to the number of the die sinks or passages $d^3$, made in each of the die-stocks $d^2$. Each of the sinks $v$, as shown at Fig. 3, has the form of the rivet-head, and when the header descends these sinks are so constructed and arranged that each of them will engage with the outer ends of one of the rivet-blanks where projecting from each of the die-passages $d^3$, and in descending will swage thereon a head corresponding to the form of the sinks $v$. This header is operated by the cam $C^2$ to engage with the heads of the rivet-blanks in one of the die-holders at each revolution of the shaft $S'$.

The letter $f'$ designates an $f$-formed lever, which is pivoted at $p^4$ to the frame F and at its upper end is made with a curved head $h^5$, and the letter $a^4$ designates an arm that is projected inwardly from the side of said lever $f'$ through the opening $O^2$, made in the frame F, to enter the recess $r^4$, made in the rear face of the header H, as shown at Fig. 3.

The letter $S^6$ designates a spiral spring, one end of which at $e^3$ is connected to the frame F, and the other end at $e^4$ is connected to the lower end of the lever $f'$. As thus constructed, when the header H is operated to descend it so moves against the force of the spring $S^6$ from the engagement which the arm $a^4$ of the lever $f'$ makes with the recess $r^4$ of the header and the connection made by said spring with the frame and with said lever $f'$. When the operation of the cam $C^2$ ceases, then the combined action of the spring $S^6$ and the lever $f'$ causes the header to rise away from its engagement with the die-stocks and the rivets therein.

The letter B designates a cutting-blade, which is shown in position within the machine at Fig. 1 and as separated therefrom at Fig. 4. This blade is arranged to be moved in vertical slides J, made in each side of the frame-extension $F^2$, as shown at Figs. 1 and 3, and it makes a shear engagement with the outer edge of the plate $P^4$ when raised up. The upper edge of this blade is made with recesses $r^6$, that bevel upwardly and inwardly with a cuniform concavity.

The letter $l$ designates lugs, of which there is one on the die-wheel at each side thereof, as shown at Figs. 1 and 3, horizontally in line with each other. As the die-wheel turns, these lugs $l$ each engage with one of the lips $l^2$ on each end E of the blade to move the latter vertically in its slides and so as to cut rivet-blanks from off the ends of the rods, and when the engagement between the lugs $l$ and the blade ceases, as the die-wheel revolves, then the blade B, by gravity, falls down in the slides to repeat the operation, when, as the die-wheel turns, the lugs $l$ again engage with the blade, as before.

The letters $R^2$ and $R^3$ designate feeding-rolls, arranged one above the other and having bearings $b^6$ in the frame-extension $F^2$. Each of these rolls has annular grooves $g'$ made therein, so as to be vertically in line in each of the rolls. The upper one of these rolls and that indicated at $R^2$ has on its shaft $S^7$ a pulley $p^6$, and the letter $B^4$ designates a sprocket-belt adapted to run thereon and on the pulley $p^7$, arranged on the shaft $S^{10}$.

The letter $C^6$ designates a cam arranged on the driving-pulley P, which at each revolution of the latter makes a traction engagement with the pulley $p^7$ to operate the latter, the belt $B^4$, the pulley $p^6$, and the rolls $R^2$ and $R^3$. The function of these rolls $R^2$ and $R^3$ as thus constructed and arranged is to at intervals move the rods from which the rivet-blanks are cut and cause them to enter the dies and to hold the rods therein while being cut.

The letters I designate plungers adapted to move outwardly and inwardly in recesses $i^2$, made in the die-wheel from side to side thereof in line with its axis. Each of these plungers is constructed with a series of pins $p^9$, projected from the inner face thereof at right angles thereto and corresponding in number to the number of die-passages $d^3$ in each of the die-stocks $d^2$, and these pins, or the plungers proper I, are caused to move in the recesses $i^2$, and the pins are caused to pass through the passages $d^5$ to enter the passages $d^3$ from the inner end thereof to force the rivets from out the die-passages. One of the plungers is shown as detached at Fig. 8, and they are all shown as in position within the recesses at Fig. 3. These plungers I where within the recesses have their ends $E^4$ extended beyond the sides of the die-wheel, and the letter N designates a plate provided with a cam $K^2$, there being one of said plates attached to the frame upon each of its opposite and inner sides, one of them being shown in position at Fig. 3. As the die-wheel revolves, when the plunger ends E⁴ where projecting beyond the die-wheel come in contact with the cam K² on the plate N at each side of the frame interior this engagement moves each one of the plungers so engaging outwardly and causes the pins $p^9$ thereon to pass through the die-passages $d^3$ to engage with the inner ends of the rivets therein, so as to force them therefrom. The plates N, on which the cam K² is located, as shown at Fig. 3, are secured to the interior frame sides, so as to be back of the axial center of the die-wheel shaft, so that the cams K² will only engage with the plunger ends when the upper face of the die-wheel is passing downwardly and rearwardly and after the heads have been swaged on the rivets, as before described.

The operation of the parts thus constructed and arranged is as follows: Power being applied to the pulley P, when the cam C² thereon engages with the pulley $p^7$ it operates the latter during such engagement, also the sprocket-belt B⁴ and the pulley $p^6$, as well as the rolls R² and R³, to turn and to stop turning when the engagement of the cam C² with the pulley $p^7$ ceases. As thus constructed, the feeding-rollers R² and R³ are operated with alternating periods of rotation and intermittent periods of rest. Rods of iron that have been heated being entered between the rolls R² and R³ so that each of them is within and between one of the annular grooves in each of the two rolls where vertically in line, as the rolls turn intermittently the entered ends of each of the rods will be moved inwardly, so as to enter one of the die sinks or passages of that one of the die-stocks which is at the front, with the entered ends of the rods abutting against the shoulder $h'$ made in each of the sinks or passages. While in this position the blade B is operated by the die-wheel to rise and cut off from the ends of the rods the proper blank-lengths, when the die-wheel, making another quarter-turn, brings the die-stock containing the blanks uppermost on the die-wheel, when the header H descends to put on the heads and then recedes, and while the die-wheel is making another quarter-turn the ends E E of the plunger I, coming in contact with the cam K², force outwardly the plunger and its pins within the part $d^5$ of the die sinks or passages, which forces the completed rivets from out of the sinks.

As the die-stocks made with the sinks or passages $d^3$, the shoulders $h'$, and passages $d^5$, in combination with the plunger I, made with the pins $p^9$, would perform the same function of receiving and holding the rivet-blanks while being headed, and then move the rivets from out the sinks or passages, whether operated by the mechanism which I illustrate and describe or other mechanism which would cause them to act in substantially the same manner, I do not limit my invention of the die-stocks made with said passages and combined to operate with a plunger having pins to their further combination with the means which I employ to operate them.

Having thus described my invention, what I claim, and desire to secure by Letters Patent, is—

1. In a machine for making rivets, the combination, with a die-wheel operated at each movement to make a quarter-turn with alternating periods of rest, of die-stocks arranged in the perimeter thereof so as to be diametrically opposite, sinks made in the die-stocks constructed to receive the rivet-blanks, said sinks being provided with a shoulder against which the inner ends of the blanks abut, and a tubular passage-way opening out from said sinks back of the shoulder therein, a header reciprocatingly operated to descend onto the rivet-blanks where projecting from said sinks, and a plunger provided with pins adapted to enter the tubular passages of the die-stocks where back of the sinks, constructed and operated to push the rivets from the sinks, substantially in the manner as and for the purposes set forth.

2. In a machine for making rivets, the combination, with the stocks $d^2$, made with sinks $d^3$, shoulders $h'$, and tube-form passages $d^5$, said sinks being constructed and arranged to receive rivet-blanks with the inner ends thereof abutting against said shoulders while being headed, of the plunger I, made with pins adapted to enter said passages and operated by said plunger to force the rivets from out said sinks, substantially in the manner as and for the purposes set forth.

3. The combination, with the die-wheel W, constructed and arranged to be operated substantially as described, of the stocks $d^2$, made with the sinks $d^3$, shoulders $h'$, and tubular passage-ways $d^5$, said stocks being arranged in the perimeter of said die-wheel, the recesses $i^2$, made in said die-wheel, the plungers I, arranged in said recesses, constructed to move therein and provided with pins $p^9$ to enter the passages in said die-stocks, and the cam K, arranged on each of the inner faces of the machine-frame, adapted to engage with said plungers, substantially in the manner as and for the purposes set forth.

4. The combination, with the die-wheel W, constructed with the die-stocks $d^2$, having sinks $d^3$, made with shoulders $h'$ and tube-form passages $d^5$, said die-wheel being operated to make a quarter-revolution, with alternating periods of rest at each rotation of the driving-shaft, substantially as described, of the header H, adapted to move in slides in the machine-frame and made with a series of sinks $v$ on its lower end, and the cam C² on the driving-shaft, arranged to operate said header while the die-wheel is at rest, substantially in the manner as and for the purposes set forth.

5. The combination, with the die-wheel W, constructed with die-stocks $d^2$, having sinks $d^3$, made with shoulders $h'$ and tube-form passages $d^5$, said die-wheel being operated to make a quarter-turn at each revolution of the driving-shaft, substantially as described, of the header H, having a series of sinks $v$ in its lower end and made with a recess $r^4$ in its rear face, the lever $f'$, pivoted to the machine-frame at $p^4$ and having an arm $a^4$, adapted to enter the recess in the back of said header, and a spring $S^6$, connecting the lower end of said lever with the machine-frame, substantially in the manner as and for the purposes set forth.

6. The combination, with the die-wheel W, made with lugs $l$ and having rivet-form die-sinks in its perimeter, said wheel being constructed and operated to make a quarter-turn, with regular intermittent periods of rest at each revolution of the driving-shaft, substantially as described, of the rollers $R^2$ and $R^3$, made with annular grooves $g'$, that are vertically in line in both rollers, said rollers being operated to rotate when the die-wheel is at rest and to cease rotating when the die-wheel is moving, and a blade B, operated to engage with the lugs $l$ of the die-wheel to rise vertically, and when such engagement with the die-wheel ceases to fall by gravity, substantially in the manner as and for the purposes set forth.

7. The combination, with the die-wheel W, having rivet-form dies in its perimeter, said die-wheel being constructed and operated to make a quarter-turn, with regular alternating periods of rest at each rotation of the driving-shaft, substantially as described, of the rollers $R^2$ and $R^3$, made with the encircling grooves $g'$ and operated to rotate while the die-wheel is at rest and to cease rotating when the die-wheel is moving, substantially in the manner as and for the purposes set forth.

8. The combination, with the die-wheel W, made with the lugs $l$ and having rivet-form sinks in its perimeter, said die-wheel being constructed and arranged to make a quarter-turn, with alternating periods of rest at each revolution of the driving-shaft, substantially as described, of the rollers $R^2$ and $R^3$, made with the encircling grooves $g'$ and operated to rotate while the die-wheel is at rest and to cease rotating when the die-wheel is moving, the blade B, constructed with vertical slideways and operated to engage with the die-wheel, substantially as described, and the header H, made with the sinks $v$ in its lower end and constructed to be operated by the driving-shaft while the die-wheel is at rest, substantially in the manner as and for the purposes set forth.

Signed at Troy, New York, this 27th day of January, 1890, and in the presence of the two witnesses whose names are hereto written.

FRANK DANKS.

Witnesses:
CHARLES S. BRINTNALL,
N. E. HAGAN.